United States Patent [19]
Arimilli et al.

[11] Patent Number: 5,940,611
[45] Date of Patent: *Aug. 17, 1999

[54] METHOD AND SYSTEM FOR FRONT-END GATHERING OF STORE INSTRUCTIONS WITHIN A DATA-PROCESSING SYSTEM

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[ * ] Notice: This patent is subject to a terminal disclaimer.

[21] Appl. No.: 08/837,519

[22] Filed: Apr. 14, 1997

[51] Int. Cl.$^6$ .................................................... G06F 9/30
[52] U.S. Cl. ............................................................ 395/566
[58] Field of Search ................................... 395/566, 872, 395/381; 711/136.143, 154

[56] References Cited

U.S. PATENT DOCUMENTS

| | | | |
|---|---|---|---|
| 4,881,163 | 11/1989 | Thomas et al. | 364/200 |
| 5,375,223 | 12/1994 | Meyers et al. | 395/425 |
| 5,450,564 | 9/1995 | Hassler et al. | 395/495 |
| 5,465,376 | 11/1995 | Yoshida | 395/800 |
| 5,579,504 | 11/1996 | Callander et al. | 395/471 |
| 5,590,379 | 12/1996 | Hassler et al. | 395/851 |
| 5,592,432 | 1/1997 | Vishlitzky et al. | 365/230.03 |
| 5,615,402 | 3/1997 | Quattromani et al. | 395/566 |

*Primary Examiner*—David Y. Eng
*Attorney, Agent, or Firm*—Richard A. Henkler; Antony P. Ng; Andrew J. Dillon

[57] ABSTRACT

A method and system for front-end gathering of store instructions within a processor is disclosed. In accordance with the method and system of the present invention, a store queue within a data-processing system includes a front-end queue and a back-end queue. Multiple entries are provided in the back-end queue, and each entry includes an address field, a byte-count field, and a data field. A determination is first made as to whether or not a data field of a first entry of the front-end queue is filled completely. In response to a determination that the data field of the first entry of the front-end queue is not filled completely, another determination is made as to whether or not an address for a store instruction in a subsequent second entry is equal to an address for the store instruction in the first entry plus a byte count in the first entry. In response to a determination that the address for the store instruction in the subsequent second entry is equal to the address for the store instruction in the first entry plus the byte count in the first entry, the store instruction in the subsequent second entry is collapsed into the store instruction in the first entry.

10 Claims, 4 Drawing Sheets

METHOD AND SYSTEM FOR FRONT-END GATHERING OF STORE INSTRUCTIONS WITHIN A DATA-PROCESSING SYSTEM

BACKGROUND OF THE INVENTION

1. Technical Field

The present invention relates to a method and system for data processing in general and, in particular, to a method and system for storing data to a memory within a data-processing system. Still more particularly, the present invention relates to a method and system for front-end gathering of store instructions within a data-processing system.

2. Description of the Prior Art

A typical superscalar processor comprises multiple execution units, and each is optimized to execute a corresponding type of instructions. For example, the processor may contain a fixed-point unit (FXU) for executing fixed-point instructions, a floating-point unit (FPU) for executing floating-point instructions, a branch-processing unit (BPU) for executing branch instructions, and a load-store unit (LSU) for executing load and store instructions.

When an instruction is retrieved from a system memory for execution by the processor, the instruction is first decoded in order to determine an execution unit to which the instruction should be dispatched. In the case of a store instruction, it will be dispatched to the LSU for execution. Execution of a store instruction begins with calculating the effective address (EA) of the memory location to which the data associated with the store instruction is to be written. After the EA of the store instruction has been calculated, the execution of the store instruction is completed by committing the data associated with the store instruction to a store queue from which the data will be written to a specified memory location.

Generally speaking, with an on-chip data cache, only a small performance inefficiency may result from multiple consecutive store instructions to the system memory. In most cases, such on-chip data caches permit data access to be performed in as little as a single cycle. When store instructions are write-throughs or cache-inhibited, however, multiple consecutive store instructions will cause performance inefficiency to rise due to the additional latency of bus access.

When a page is designated as cache-allowed, the processor utilizes the cache to perform load and store operations to either the cache or the system memory, depending on the other memory/cache access attributes for the page. When a page is designated as cache-inhibited, the processor must bypass the cache and performs load and store operations directly to the system main memory in a sequential manner. In data-processing systems that utilize a store queue for the temporarily holding store instructions, it is very typical for the store queue to be implemented with a collection of registers that are organized in a First-In-First-Out (FIFO) manner. Further, the store queue may be divided into a front-end queue and a back-end queue. Store instructions are added to the entries of the front-end queue while they are removed from the entries of the back-end queue. Each entry of the store queue holds an address, a byte count, and data for a store instruction. The total number of entries for the store queue is usually small because of the size constraints of the chip, even though the overall performance may suffer because the execution of store instructions will halt when the store queue becomes full.

Consequently, it would be desirable to provide an efficient method and system for gathering these store instructions in the front-end of the store queue such that the number of instructions transferred to the data cache or the system memory via a system bus can be effectively reduced.

SUMMARY OF THE INVENTION

In view of the foregoing, it is therefore an object of the present invention to provide an improved method and system for data processing.

It is another object of the present invention to provide an improved method and system for storing data to a memory within a data-processing system.

It is yet another object of the present invention to provide an improved method and system for front-end gathering of store instructions within a data-processing system.

In accordance with the method and system of the present invention, a store queue within a data-processing system includes a front-end queue and a back-end queue. Multiple entries are provided in the back-end queue, and each entry includes an address field, a byte-count field, and a data field. A determination is first made as to whether or not a data field of a first entry of the front-end queue is filled completely. In response to a determination that the data field of the first entry of the front-end queue is not filled completely, another determination is made as to whether or not an address for a store instruction in a subsequent second entry is equal to an address for the store instruction in the first entry plus a byte count in the first entry. In response to a determination that the address for the store instruction in the subsequent second entry is equal to the address for the store instruction in the first entry plus the byte count in the first entry, the store instruction in the subsequent second entry is collapsed into the store instruction in the first entry.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

An illustrative embodiment under the present disclosure may be implemented on a variety of cache-based processors and/or data-processing systems. For the purpose of illustration, a PowerPC™ processor manufactured by International Business Machines Corporation, which operates according to reduced instruction-set-computing (RISC) techniques, is utilized to demonstrate a preferred embodiment of the present invention.

Figure 1:
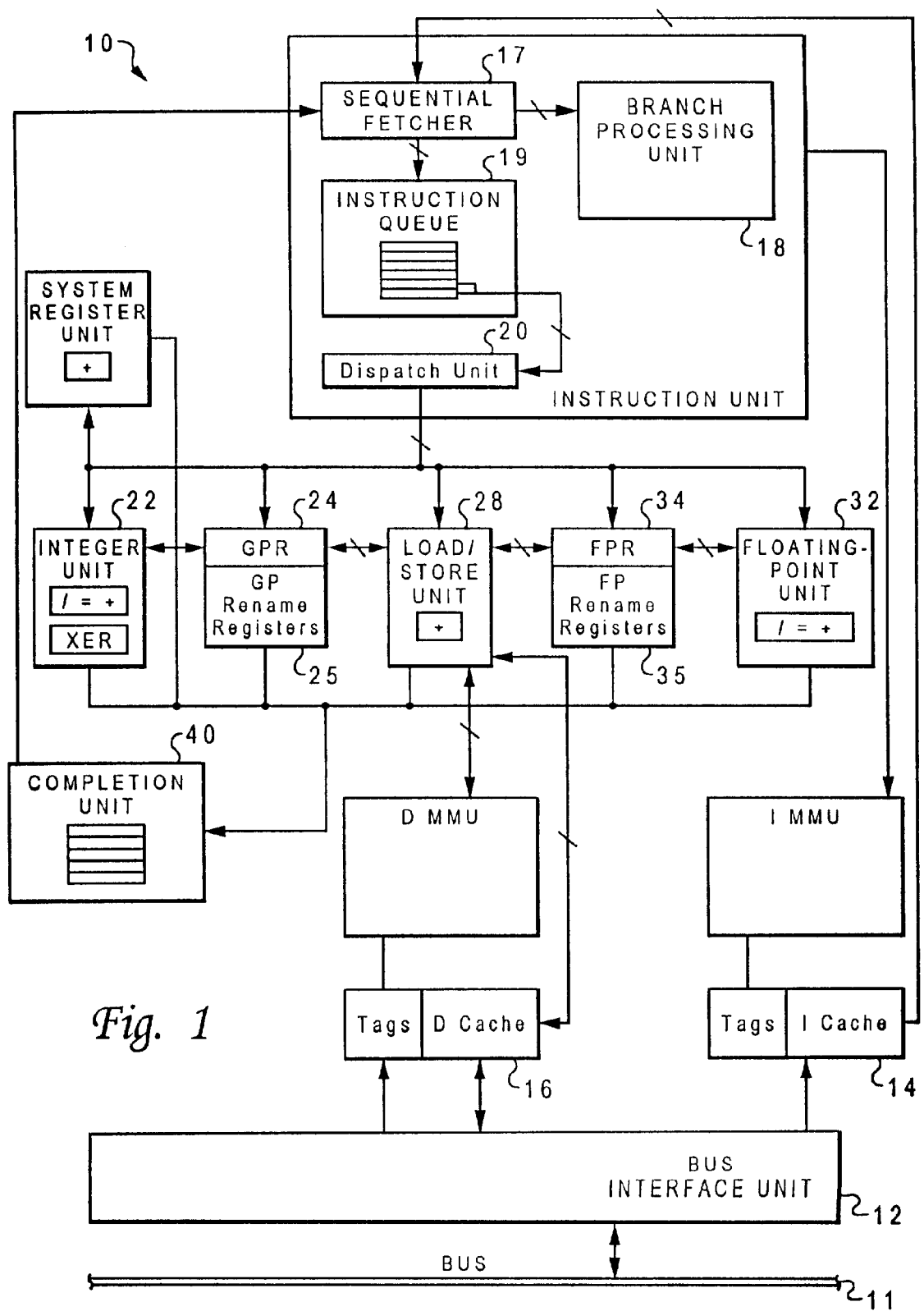
FIG. 1 is a block diagram of a processor in which the present invention may be implemented.

Referring now to the drawings and, in particular, to FIG. 1, there is illustrated a block diagram of a processor 10 in which the present invention may be implemented. In a preferred embodiment of the present invention, processor 10 is a single integrated-circuit superscalar processor, comprising various registers, buffers, execution units, and functional units. As depicted in FIG. 1, processor 10 is coupled to system bus 11 via a bus interface unit (BIU) 12 within processor 10. BIU 12 controls the transfer of information between processor 10 and other devices, such as a main memory (not shown), that are coupled to system bus 11. Processor 10, system bus 11, and the other devices coupled to system bus 11 together form a host data-processing system.

Within processor 10, BIU 12 is connected to instruction cache 14 and data cache 16. Both instruction cache 14 and data cache 16 are high-speed caches which enable processor 10 to achieve a relatively fast access time to a subset of instructions or data previously transferred from the main memory to caches 14 and 16, thus improving the speed of operation of the host data-processing system. Instruction cache 14 is further coupled to sequential fetcher 17 which fetches instructions from instruction cache 14 during each execution cycle. Sequential fetcher 17 transmits branch instructions fetched from instruction cache 14 to branch processing unit (BPU) 18 for execution, but temporarily stores sequential instructions within instruction queue 19 for later execution by other execution circuitry within processor 10.

In addition to BPU 18, the execution circuitry of processor 10 includes three execution units, namely integer unit (IU) 22, load/store unit (LSU) 28, and floating-point unit (FPU) 32. Each of these three execution units may execute one or more classes of instructions, and all execution units operate concurrently during each processor cycle. IU 22 performs fixed-point mathematical operations such as addition, subtraction, ANDing, ORing, and XORing, utilizing source operands received from specified general purpose registers (GPR) 24 or GPR rename registers 25. Conversely, FPU 32 performs floating-point operations, such as floating-point multiplication and division, on source operands received from floating-point registers (FPR) 34 or FPR rename registers 35. As its name implies, LSU 28 executes floating-point and fixed-point instructions which load data from either data cache 16 or the main memory into selected GPRs 24 or FPRs 34, which store data from a selected one of GPRs 24, GPR rename registers 25, FPRs 34, or FPR rename registers 35.

Processor 10 employs both pipelining and out-of-order execution of instructions to further improve the performance of its superscalar architecture. Accordingly, instructions can be executed by IU 22, LSU 28, and FPU 32 in any order as long as data dependencies are observed.

Figure 2:
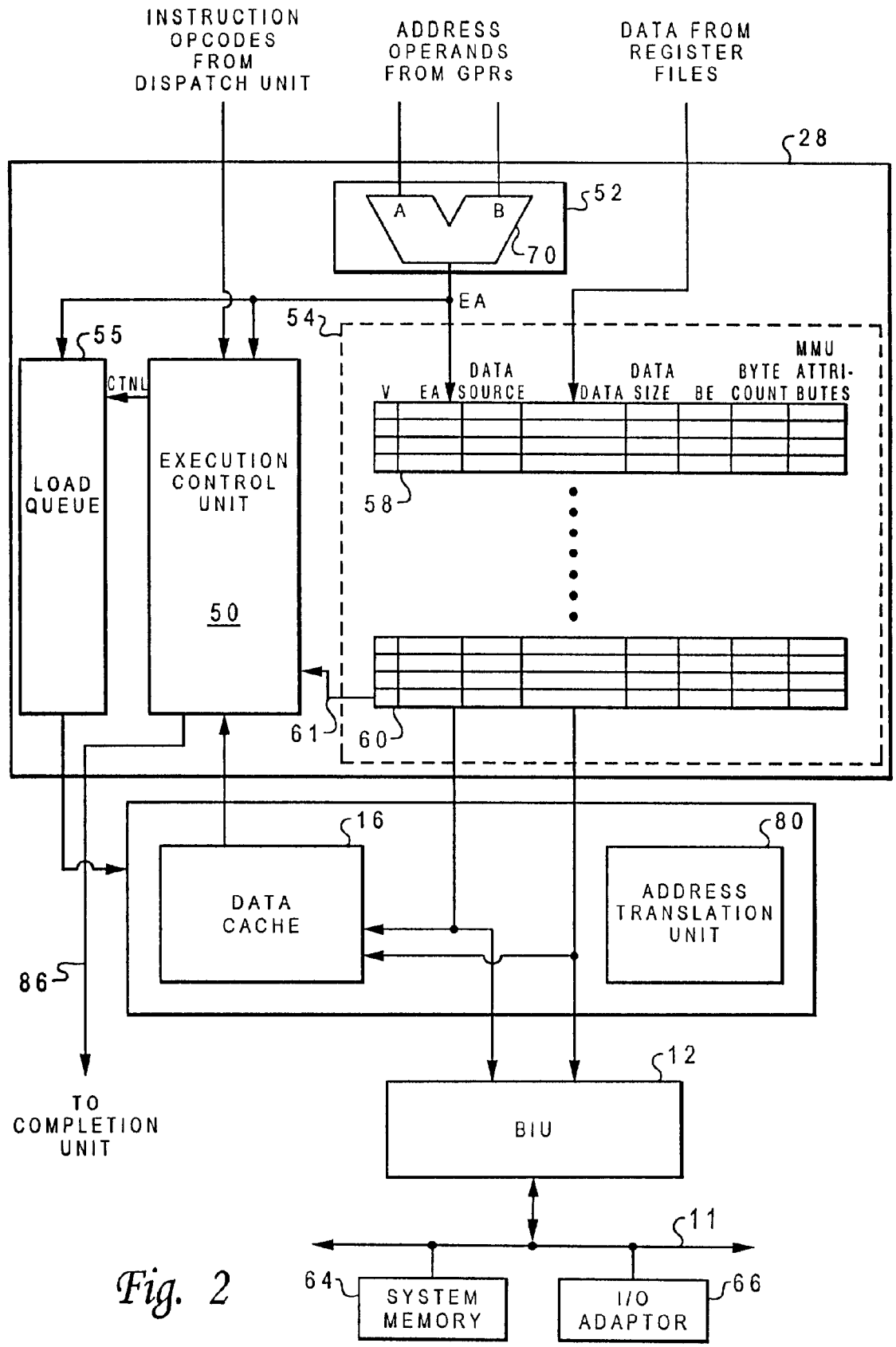
FIG. 2 is a detailed block diagram of the load-store unit of FIG. 1.

Referring now to FIG. 2, there is depicted a more detailed block diagram of load-store unit (LSU) 28 of FIG. 1. As depicted, LSU 28 includes execution control unit 50 which controls the execution of load and store instructions dispatched to LSU 28 by the dispatch unit. Execution control unit 50 includes logic for decoding load and store instruction opcodes and for comparing store instruction addresses and attributes to determine whether to merge store instructions. LSU 28 further includes address calculation unit 52 which receives the 32-bit address operands associated with each load and store instruction. Utilizing adder 70, address calculation unit 52 sums the address operands to generate a 32-bit effective address (EA) for the associated instruction. LSU 28 also includes store queue 54 and load queue 55, which manage the EA, data, and additional instruction information associated with store and load instructions dispatched to LSU 28.

As a preferred embodiment of the present invention, store queue 54 includes a front-end queue (FEQ) 58 and a back-end queue (BEQ) 60. As shown, each of FEQ 58 and BEQ 60 comprises a multiple-entry First-In-First-Out (FIFO) register. Each entry within FEQ 58 and BEQ 60 preferably has a 32-bit EA field that stores the EA generated by address calculation unit 52, a data source field that specifies which GPR(s) or FPR(s) store(s) the data associated with the store instruction, and a 64-bit data field that contains the data to be stored. The validity of the EA and data fields of each entry of FEQ 58 and BEQ 60 is indicated individually by the state of valid bits within a valid field. Each entry within FEQ 58 and BEQ 60 further includes several attribute fields, including a data-size field that indicates the byte size of the data, a byte enable (BE) field that specifies which of the data bytes contain valid data, a byte count field that contains the byte count associated with the data, and an MMU attribute field that indicates the MMU attributes of the data.

In addition to being stored within the EA field of an entry of FEQ 58, the EA generated by address calculation unit 52 for each store instruction is also passed to execution control unit 50, which utilizes the EA to determine if the associated store instruction can be merged with another store instruction in order to enhance processor efficiency. As illustrated at reference numeral 61, execution control unit 50 is further coupled to BEQ 60 such that execution control unit 50 can read in the bottom entry of BEQ 60 for comparison of the EA and attributes of the store instruction in the bottom entry with those of another store instruction to determine if the two store instructions can be merged. While a store instruction is stored in BEQ 60, the EA of the store instruction is passed to address translation unit 80 in order to translate the EA of the store instruction into a physical address and to determine if the store instruction generated an exception. The physical address bits (bits 0–20) returned to FEQ 58 by address translation unit 80 are stored into the EA field of the appropriate entry in BEQ 60.

When a store operation is to be performed, the physical address within the EA field of the bottom entry of BEQ 60 is passed to data cache 16 in conjunction with the data stored in the bottom entry of BEQ 60, if the store is cacheable. A cache controller within data cache 16 then manages the storage of the data in data cache 16. If data associated with the physical address is not resident within data cache 16 or if the store is cache-inhibited, the physical address and data are passed to BIU 12, which stores the data to main memory 64 or an I/O adapter 66 via system bus 11. Such I/O adapter may be utilized to communicate with an external computer network such as an intranet or internet.

Figure 3:
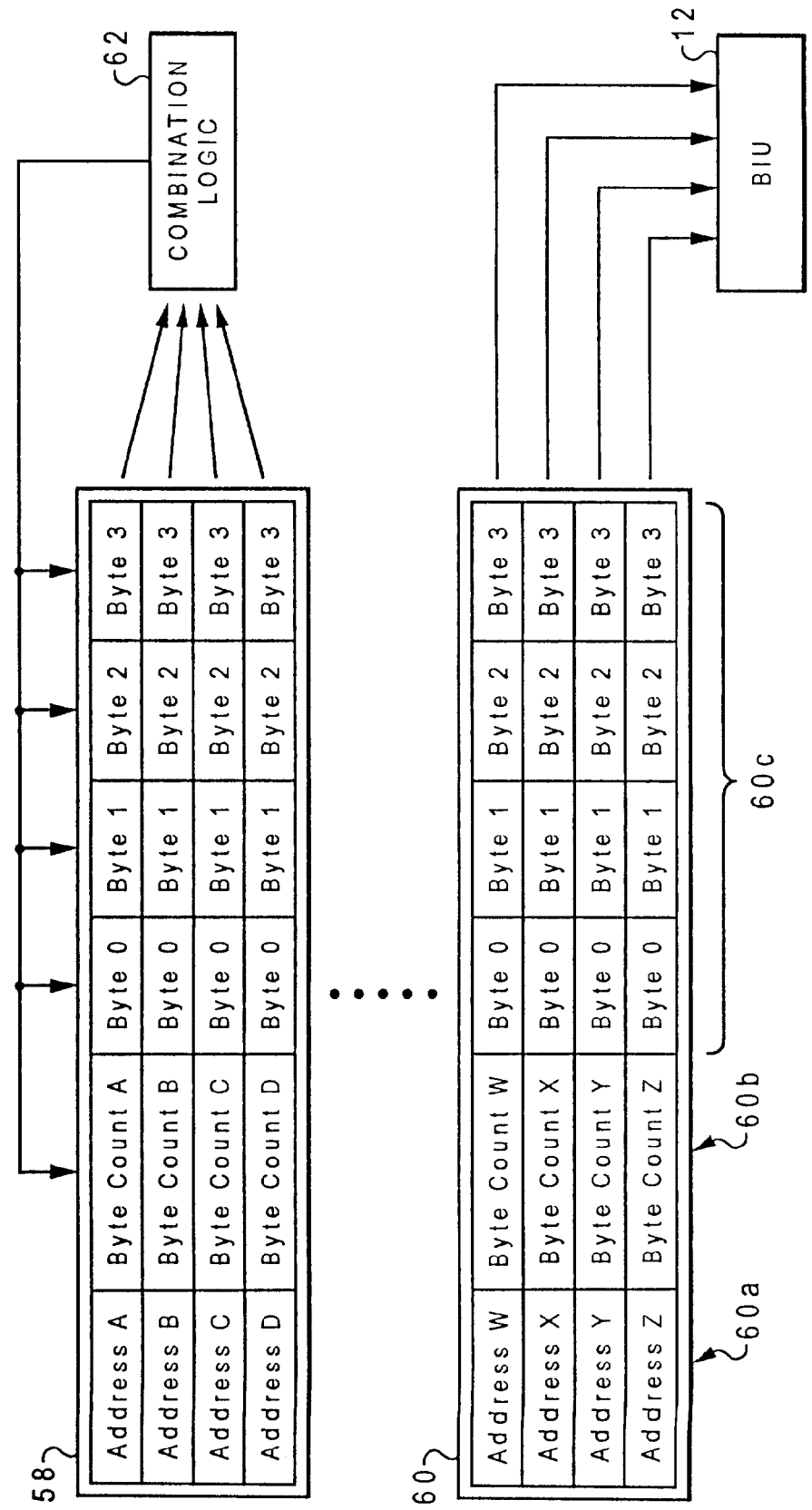
FIG. 3 is a block diagram of the stored queue and other components for front-end gathering of store instructions, in accordance with a preferred embodiment of the present invention.

Referring now to FIG. 3, there is depicted a block diagram of the stored queue and other components for front-end gathering of store instructions, in accordance with a preferred embodiment of the present invention. As shown, each entry within FEQ 58 is coupled to combination logic 62, while each entry within BEQ 60 is coupled to BIU 12. Each entry within BEQ 60 includes an Address field 60a, a Byte Count field 60b, and a Byte data field 60c.

As a preferred embodiment of the present invention, if Address A equals to Address B plus Byte Count B, then combination logic 62 can collapse the store instruction to Address A with the store instruction to Address B into one single System Bus transfer. This is performed by altering Byte Count B to Byte Count B plus Byte Count A, and placing the data for Address A into the byte lane for Address B within FEQ 58. In this manner, as shown in FIG. 3, as many as four one-byte store instructions may be issued as one four-byte store instruction to the System Bus via BIU 12, if Address A equals to Address B plus Byte Count B, Address B equals to Address C plus Byte Count C, and Address C equals to Address D plus Byte Count D, with each of Byte Counts A, B, C, and D equal to one.

Thus, under the PowerPC™ architecture, as many as four store instructions, each up to four bytes long, can be combined into a single sixteen-byte System Bus transfer. By the same token, any combination of sequential addresses up to a sixteen-byte boundary can be gathered out of the four front-end store queue entries.

Figure 4:
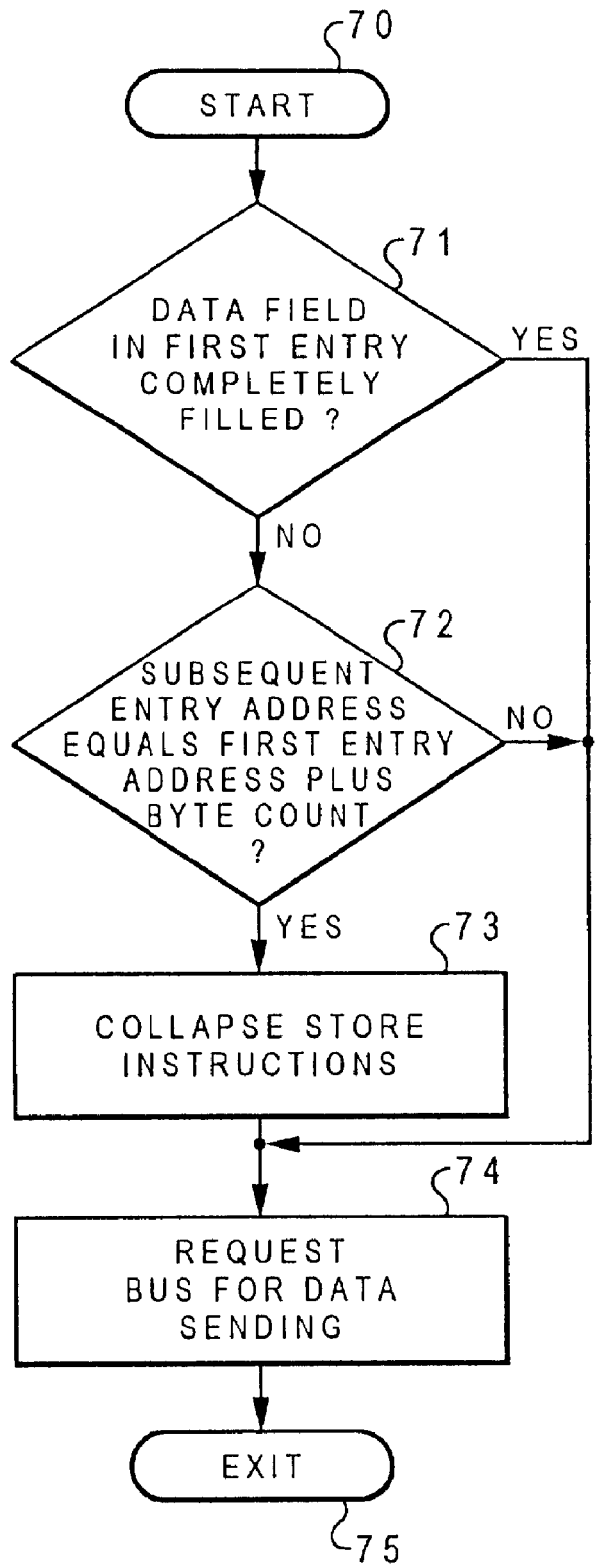
FIG. 4 is a high-level logic flow diagram illustrating a method for front-end gathering of store instructions within a store queue of a processor, in accordance with a preferred embodiment of the present invention.

With reference now to FIG. 4, there is depicted a high-level logic flow diagram illustrating a method for front-end gathering of store instructions within a store queue of a processor, in accordance with a preferred embodiment of the present invention. Starting at block 70, a determination is made as to whether or not a data field of a first entry in the front-end queue of the store queue is filled completely, as shown in block 71. If the data field of the first entry in the front-end queue of the store queue is filled completely, the process proceeds to block 74.

However, if the data field of the first entry in the front-end queue of the store queue is not filled completely, another determination is made as to whether or not the address for a store instruction in a second byte lane is equal to the address for a store instruction in the first entry plus a byte count in the first entry, as depicted in block 72. (The second entry is an immediate subsequent entry to the first entry.) If yes, then the process proceeds to block 74; otherwise, the store instruction in the second entry is collapsed into the store instruction in the first entry, as illustrated in block 73. Finally, the process exits at block 75.

As an alternative embodiment, the Byte Count fields A, B, C, and D may be utilized to index the exact location(s) of Byte data field 60c in which data are stored. In this embodiment, if Address A equals to or is greater than Address B plus Byte count B, but is still within the byte lane for Address B, then the store instruction to Address A can still be collapsed into the store instruction to Address B, such that both store instruction can be sent in one single System Bus transfer.

As has been described, the present invention provides an improved method for front-end gathering of store instructions within a data-processing system. Under a preferred embodiment of the present invention, the sequential store instructions in the front-end of the store queue are collapsed into one system bus transfer, if possible. This allows the store queue to be emptied in a more efficient manner and prevents the processor from stopping its execution because the store queue is full.

Although a method of front-end gathering has been described with reference to an exemplary front-end gathering operation in which two single-precision stores were gathered, it will be appreciated from the foregoing description that both single- and double-precision stores can be gathered utilizing the illustrative embodiment described above. Furthermore, it will be appreciated that front-end gathering provides maximum enhancement of processor performance for write-through and cache-inhibited store instructions due to the decrease in system-bus latency. For example, without front-end gathering, if two store instructions require bus access of 14 cycles, then, with front-end gathering, the same two store instructions only require a single seven-cycle bus access, thereby substantially reducing the bus latency incurred.

While the invention has been particularly shown and described with reference to a preferred embodiment, it will be understood by those skilled in the art that various changes in form and detail may be made therein without departing from the spirit and scope of the invention.

What is claimed is:

1. A method for front-end gathering of store instructions within a store queue of a processor, wherein said store queue includes a front-end queue, said method comprising the steps of:

provide a plurality of entries in said front-end queue, each entry having an address field, a byte count field, and a data field, wherein each of said plurality of entries includes a plurality of levels;

determining whether or not all entries in a first level of said front-end queue are filled completely;

in response to a determination that said all entries in said first level of said front-end queue are not filled completely, determining whether or not an address for a store operation intended for an entry in a second level of said front-end queue is equal to an address for a store operation in an entry in said first level plus a byte count in said first level; and in response to a determination that said address for a store operation intended for an entry in said second level is equal to said address for a store operation in an entry in said first level plus said byte count in said first level, combining said store operation intended for an entry in said second level with said store operation in said first level without shifting said store operation intended for an entry in said second level.

2. The method according to claim 1, wherein said method further includes a step of requesting a data transfer to a back-end queue within said store queue, in response to a determination that said entries in said first level of said front-end queue is filled completely.

3. The method according to claim 1, wherein said method further includes a step of requesting a data transfer to a back-end queue within said store queue, in response to a determination that said address for a store operation in a subsequent second entry is not equal to said address for a store operation in said first entry plus said byte count in said first entry.

4. The method according to claim 1, wherein said plurality of entries front-end queue is comprised of a plurality of registers.

5. The method according to claim 1, wherein said method further includes a step of performing a single store operation to a data cache, a system memory or an I/O device.

6. A processor having a store queue capable of back-end gathering of store instructions, said store queue includes a front-end queue, said processor comprising:

a plurality of entries in said front-end queue, each entry having an address field, a byte-count field, and a data field, wherein each of said plurality of entries includes a plurality of levels;

means for determining whether or not all entries in a first level of said front-end queue are filled completely;

means for determining whether or not an address for a store operation intended for an entry in a second level of said front-end queue is equal to an address for a store operation in an entry in said first level plus a byte count in said first level, in response to a determination that said all entries in said first level of said front-end queue are not filled completely; and means for combining said store operation intended for an entry in said second level with said store operation in said first level without shifting said store operation intended for an entry in said second level, in response to a determination that said address for a store operation intended for an entry in said second level is equal to said address for a store operation in an entry in said first level plus said byte count in said first level.

7. The processor according to claim 6, wherein said processor further includes a means for requesting a data transfer to a back-end queue within said store queue, in response to a determination that said entries in said first level of said front-end queue is filled completely.

8. The processor according to claim 6, wherein said processor further includes a means for requesting a data transfer to a back-end queue within said store queue, in response to a determination that said address for a store operation in a subsequent second entry is not equal to said address for a store operation in said first entry plus said byte count in said first entry.

9. The processor according to claim 6, wherein said plurality of entries in the front-end queue is comprised of a plurality of registers.

10. The processor according to claim 6, wherein said method further includes a step of performing a single store operation to a data cache, a system memory, or an I/O device.

* * * * *